US009338482B2

(12) United States Patent
Hållmarker et al.

(10) Patent No.: US 9,338,482 B2
(45) Date of Patent: May 10, 2016

(54) ENHANCED GROUP OF PICTURES (GOP) ALIGNMENT IN MEDIA STREAM VARIANTS (75) Inventors: Ola Hållmarker, Segeltorp (SE); Dag Henriksson, Spanga (SE); Gabriel Netterdag, Tyreso (SE)

(73) Assignee: MobiTV, Inc., Emeryville, CA (US)

( * ) Notice: Subject to any disclaimer, the term of this patent is extended or adjusted under 35 U.S.C. 154(b) by 403 days.

(21) Appl. No.: 13/308,062

(22) Filed: Nov. 30, 2011

(65) Prior Publication Data
US 2013/0136190 A1  May 30, 2013

(51) Int. Cl.
| H04N 7/26 | (2006.01) |
| H04N 21/2343 | (2011.01) |
| H04N 21/2662 | (2011.01) |
| H04N 21/6379 | (2011.01) |
| H04N 21/845 | (2011.01) |
| H04N 21/854 | (2011.01) |
| H04N 21/2187 | (2011.01) |
| H04N 21/61 | (2011.01) |

(52) U.S. Cl.
CPC ..... *H04N 21/2343* (2013.01); *H04N 21/23439* (2013.01); *H04N 21/2662* (2013.01); *H04N 21/6143* (2013.01); *H04N 21/6379* (2013.01); *H04N 21/8455* (2013.01); *H04N 21/8456* (2013.01); *H04N 21/85406* (2013.01); *H04N 21/2187* (2013.01); *H04N 21/6125* (2013.01)

(58) Field of Classification Search
CPC .................................................. H04N 21/2343
USPC ..................................................... 375/240.26
See application file for complete search history.

(56) References Cited

U.S. PATENT DOCUMENTS

| 5,877,814 | A * | 3/1999 | Reininger .......... H04N 21/2365 348/500 |
| 6,055,270 | A * | 4/2000 | Ozkan ................ H04N 21/2365 375/240.03 |
| 6,192,154 | B1 * | 2/2001 | Rajagopalan et al. ........ 382/232 |
| 6,522,693 | B1 * | 2/2003 | Lu et al. ................... 375/240.02 |
| 6,859,496 | B1 * | 2/2005 | Boroczky ......... H04N 21/23655 375/240 |
| 7,085,322 | B2 * | 8/2006 | Ngai ................ H04N 21/23655 375/240.25 |
| 7,930,449 | B2 * | 4/2011 | Tinsman et al. ................ 710/52 |
| 8,335,873 | B2 * | 12/2012 | Tinsman ........................ 710/52 |
| 8,526,505 | B2 * | 9/2013 | Kim ............... H04N 21/234327 375/240.26 |
| 8,705,616 | B2 * | 4/2014 | He et al. ................... 375/240.02 |
| 2010/0091888 | A1 * | 4/2010 | Nemiroff ......... H04N 21/23655 375/240.28 |

FOREIGN PATENT DOCUMENTS

WO   2013082108 A1   6/2013

OTHER PUBLICATIONS

"HTTP Dynamic Streaming on the Adobe Flash Platform", Technical White Paper, Adobe Systems Inc., San Jose, CA, 2010, 18 pgs.

* cited by examiner

*Primary Examiner* — William C Vaughn, Jr.
*Assistant Examiner* — Luis Perez Fuentes
(74) *Attorney, Agent, or Firm* — Kwan & Olynick LLP (57) ABSTRACT

A media feed is received and delineated into groups of pictures (GOPs) for processing into output media streams having different quality levels. The media feed needs only to be decoded once. The decoded stream is split along different paths based on resolution, and resized output media data is sent to multiple encoders and fragmenters to generate variants in bit rate and frame rate for each resolution. The generated variants may be maintained as fragments on shared storage. A particular stream corresponding to a particular variant can be reconstructed using the encoded fragments.

14 Claims, 7 Drawing Sheets

ENHANCED GROUP OF PICTURES (GOP) ALIGNMENT IN MEDIA STREAM VARIANTS

TECHNICAL FIELD

The present disclosure relates to enhanced GOP alignment in media stream variants.

DESCRIPTION OF RELATED ART

Media streams are typically encoded or re-encoded prior to transmission to a variety of devices. In many instances, live streams are encoded into a format such as H.264 (MPEG-4 Part 10). H.264 is a block oriented motion compensation based codec that is widely used in Blu-ray Discs and streaming Internet sources. H.264 encoding can be resource intensive, and specialized hardware is often used to accelerate encoding particularly at high quality levels. In many implementations, live stream encoding servers are configured with application specific hardware to receive one or more channels or live streams and encode the channels or live streams into particular formats. The encoding servers may have the capacity to perform real-time live encoding on up to half a dozen live streams simultaneously.

In order to support the large variety of devices and networks, content needs to be provided at a variety of quality levels that may differ in bit rate, frame rate, resolution, etc. In some systems, devices can switch to different quality level streams content based on device capabilities and network resource availability. However, conventional mechanisms for allowing switching are limited, particularly with respect to temporal alignment.

Consequently, the techniques and mechanisms of the present invention provide improved mechanisms for GOP alignment.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of live media streams. However, it should be noted that live streams include not only real-time live streams but other live and near live streams as well. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

A media feed is received and delineated into groups of pictures (GOPs) for processing into output media streams having different quality levels. The media feed needs only to be decoded once. The decoded stream is split along different paths based on resolution, and resized output media data is sent to multiple encoders and fragmenters to generate variants in bit rate and frame rate for each resolution. The generated variants may be maintained as fragments on shared storage. A particular stream corresponding to a particular variant can be reconstructed using the encoded fragments.

Example Embodiments

A variety of mechanisms are used to deliver media streams to devices. Different devices and different networks may require different variants of a media stream. Some devices may request a higher bit rate or higher resolution stream while changes in network conditions may necessitate a stream or switching to a stream having a lower quality level. Some devices may be able to handle higher resolutions, while others may have limited processing resources or limited screen real estate. Consequently, many systems will encode numerous variants of each media stream. For example, a media provider covering 152 channels may encode 8 variants of each channel for a total of 1216 variants. In some instances, a media provider may actually encode each channel into 8 variants for each supported codec.

According to various embodiments, a device can adaptively switch between variants depending on device resource and network resource availability. However, different variants of the same media content are not always aligned. That is, the key frames and corresponding GOPs for different variants may be transmitted at different times. In some instances, different variants may not even have the same encoded key frames. Analysis indicates that even if the same key frames are available, key frames in associated GOPs are often not aligned, leading to temporal shifts of several seconds during a stream switch. In particular embodiments, switching between variants should be seamless for the user.

According to various embodiments, a distributed encoding system is provided that aligns key frames associated with GOPs output across all variants during the encoding stage. According to various embodiments, media streams received from satellite or content provider sources are delineated and distributed to multiple stateless encoders and fragmentation systems or fraggers. According to various embodiments, resizing is performed to adjust resolution before bit rate and frame rate transcoding are performed. In particular embodiments, GOPs are split along encoding paths according to 8 different resolutions. According to various embodiments, each of the 8 different paths can then be encoded into 2-6 quality levels. Key frames occur periodically and outputs across all variants are GOP aligned.

In some examples, media streams received from a satellite source as separated into Groups of Pictures (GOPs) and dispatched to different H.264/MPEG-4 part 10 encoders and fraggers in a cloud environment. The encoders and fraggers process their particular assigned jobs and send encoded fragments to distributed storage. Users can then access fragments corresponding to a particular variant media stream of a selected channel. Additional encoders and fraggers can be brought online or taken offline on an as needed basis. Fragments encoded for the different variants can then be stored, buffered, and/or distributed to various devices. The devices can switch between variants without having to make temporal adjustments due to GOP misalignment.

Conventional MPEG-4 files require that a player on a device parse the entire header before any of the data can be decoded. Parsing the entire header can take a notable amount of time, particularly on devices with limited network and processing resources. Consequently, the techniques and mechanisms of the present invention provide a fragmented MPEG-4 framework that allows playback upon receiving a first MPEG-4 file fragment. A second MPEG-4 file fragment can be requested using information included in the first MPEG-4 file fragment. According to various embodiments, the second MPEG-4 file fragment requested may be a fragment corresponding to a higher or lower bit-rate stream than the stream associated with the first file fragment.

MPEG-4 is an extensible container format that does not have a fixed structure for describing media types. Instead, MPEG-4 has an object hierarchy that allows custom structures to be defined for each format. The format description is stored in the sample description ('stsd') box for each stream. The sample description box may include information that may not be known until all data has been encoded. For example, the sample description box may include an average bit rate that is not known prior to encoding.

According to various embodiments, MPEG-4 files are fragmented so that a live stream can be encoded in a distribute architecture on dynamically scalable hardware, recorded, and played back in a close to live manner. MPEG-4 files can be created without having to wait until all content is written to prepare the movie headers. To allow for MPEG-4 fragmentation without out of band signaling, a box structure is provided to include synchronization information, end of file information, and chapter information. According to various embodiments, synchronization information is used to synchronize audio and video when playback entails starting in the middle of a stream. End of file information signals when the current program or file is over. This may include information to continue streaming the next program or file. Chapter information may be used for video on demand content that is broken up into chapters, possibly separated by advertisement slots.

TCP is more widely used than UDP and networking technologies including switch, load balancer, and network card technologies are more developed for TCP than for UDP. Consequently, techniques and mechanisms are provided for delivering fragmented live media over TCP. Sequence information is also maintained and/or modified to allow seamless client device operation. Timing and sequence information in a media stream is preserved.

Requests are exposed as separate files to clients and files should playback on players that handle fragmented MPEG-4. Live or near live, video on demand (VOD), and digital video record (DVR) content can all be encoded on distributed and dynamically scalable encoding resources and processed using fragmentation.

Figure 1:
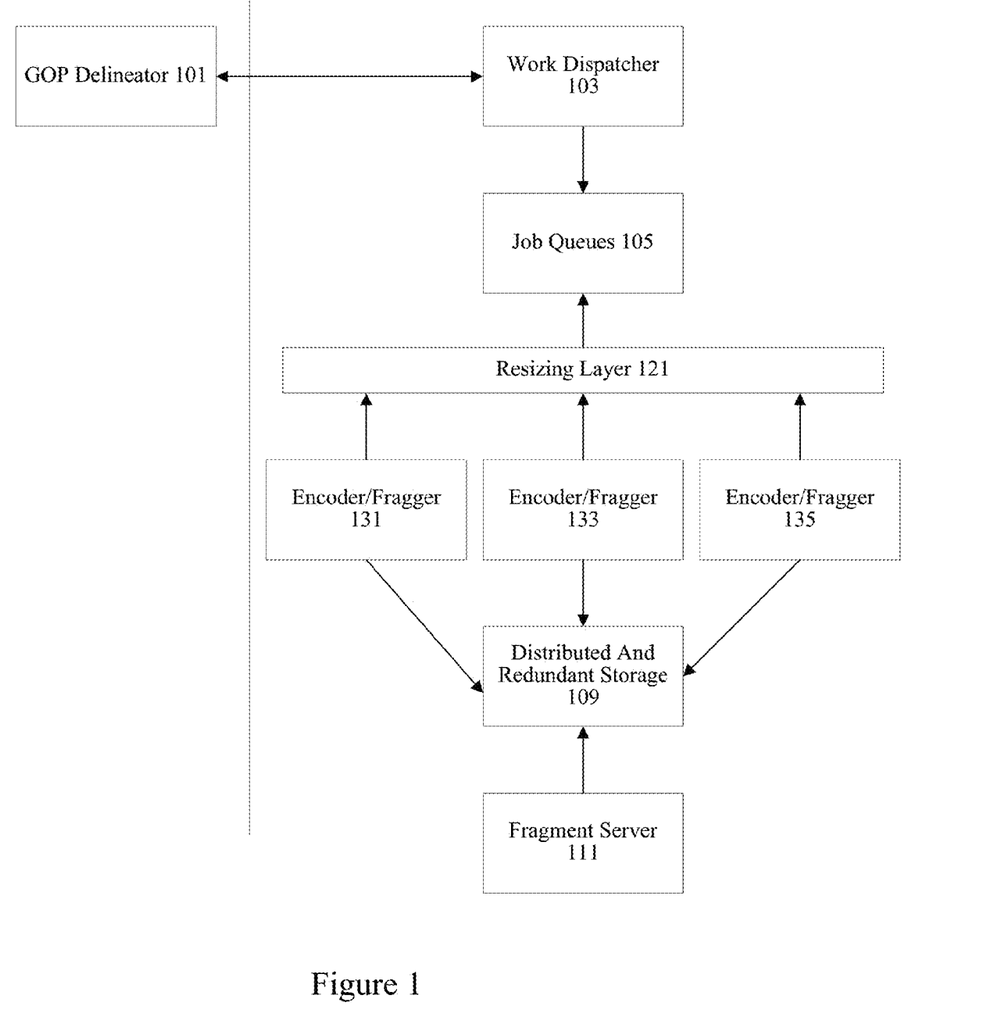
FIG. 1 illustrates one example of a system for enhanced GOP alignment.

FIG. 1 illustrates one example of a system for performing enhanced GOP alignment. According to various embodiments, a media stream is received from a content provider source such as a satellite. In particular embodiments, the media stream is provided in an MPEG-2 format. The media stream is delineated into Groups of Pictures (GOPs) using a GOP delineator 101. The GOP is a group of pictures in coded media and typically includes key and predictive frames. A key frame may be an I-frame or intra-coded frame that represents a fixed image that is independent of other pictures. According to various embodiments, each GOP begins with an I-frame. Predictive frames such as P-frames or predictive-coded frames and B-frames or bidirectionally predictive coded frames contain different information indicating distinctions from reference frames such as a key frame or another predictive frame.

After the media stream is delineated into GOPs, a work dispatcher 103 is notified that a GOP is available. According to various embodiments, the work dispatcher 103 determines if it is the one assigned to work on it as well as what should be done with the GOP. According to various embodiments, the work dispatcher may determine that the GOP should be encoded into 5 different resolutions each with 6 different quality levels. In particular embodiments, the work dispatcher 103 creates a description of what needs to be done and sends the job to job queues 105. According to various embodiments, job queues are first in first out (FIFO) queues that are empty most of the time. Encoders/fraggers 131, 133, and 135 request jobs and obtain them from the job queues 105.

According to various embodiments, encoders/fraggers 131, 133, and 135 are arranged to perform processing on resolution resized data. In some examples, resolution processing proceeds at a resizing layer 121 after a media stream is delineated into GOPs in order to allow more efficient encoding at encoders/fraggers 131, 133, and 135. In particular embodiments, a media stream is delineated into GOPs, the GOPs are split into six different paths corresponding to six different resolutions, and each of the resolutions is processed into multiple bit rates and frame rates.

According to various embodiments, hundreds or thousands of encoders/fraggers 131, 133, and 135 reside in a system. In particular embodiments, the same device performs both encoding and fragmentation, but it should be noted that separated devices can be used to perform these operations. According to various embodiments, additional encoder/fraggers can be dynamically brought online when resource usage reaches a particular threshold. Alternatively, encoder/fraggers can be taken offline when resources usage falls beneath a particular floor. According to various embodiments, encoders/fraggers 131, 133, and 135 are virtual machines that may reside on one or more physical servers that may or may not have specialized encoding hardware. In particular embodiments, a cloud service determines how many of these virtual machines to use based on established thresholds.

According to various embodiments, a unique identifier is provided for each GOP and a log of each step is maintained. After the encoders/fraggers 131, 133, and 135 complete processing jobs and output encoded fragments, the encoded fragments can be maintained in distributed and redundant storage 109. In one example, distributed and redundant storage 109 is a virtualized scale out network attached storage system. The distributed and redundant storage 109 allows a system to maintain numerous fragments on any number of virtualized storage devices.

According to various embodiments, fragments on distributed and redundant storage 109 are accessible by fragment server 111. The fragment server 111 provides the caching layer with fragments for clients. The design philosophy behind the client/server API minimizes round trips and reduces complexity as much as possible when it comes to delivery of the media data to a client device. The fragment server 111 provides live streams and/or DVR configurations.

According to various embodiments, a client device uses a media component that requests fragmented MPEG-4 files, allows trick-play, and manages bandwidth adaptation. In particular embodiments, each client device receives a media stream that is behind a live stream by 12 seconds or more. There may also be server buffering. According to various embodiments, GOP delineation, encoding, fragmentation can occur within a server buffering timeframe. By having numerous encoder/fraggers, capacity can be increased or decreased by percentage points at any time while maintaining GOP alignment for seamless variant switching.

Figure 2:
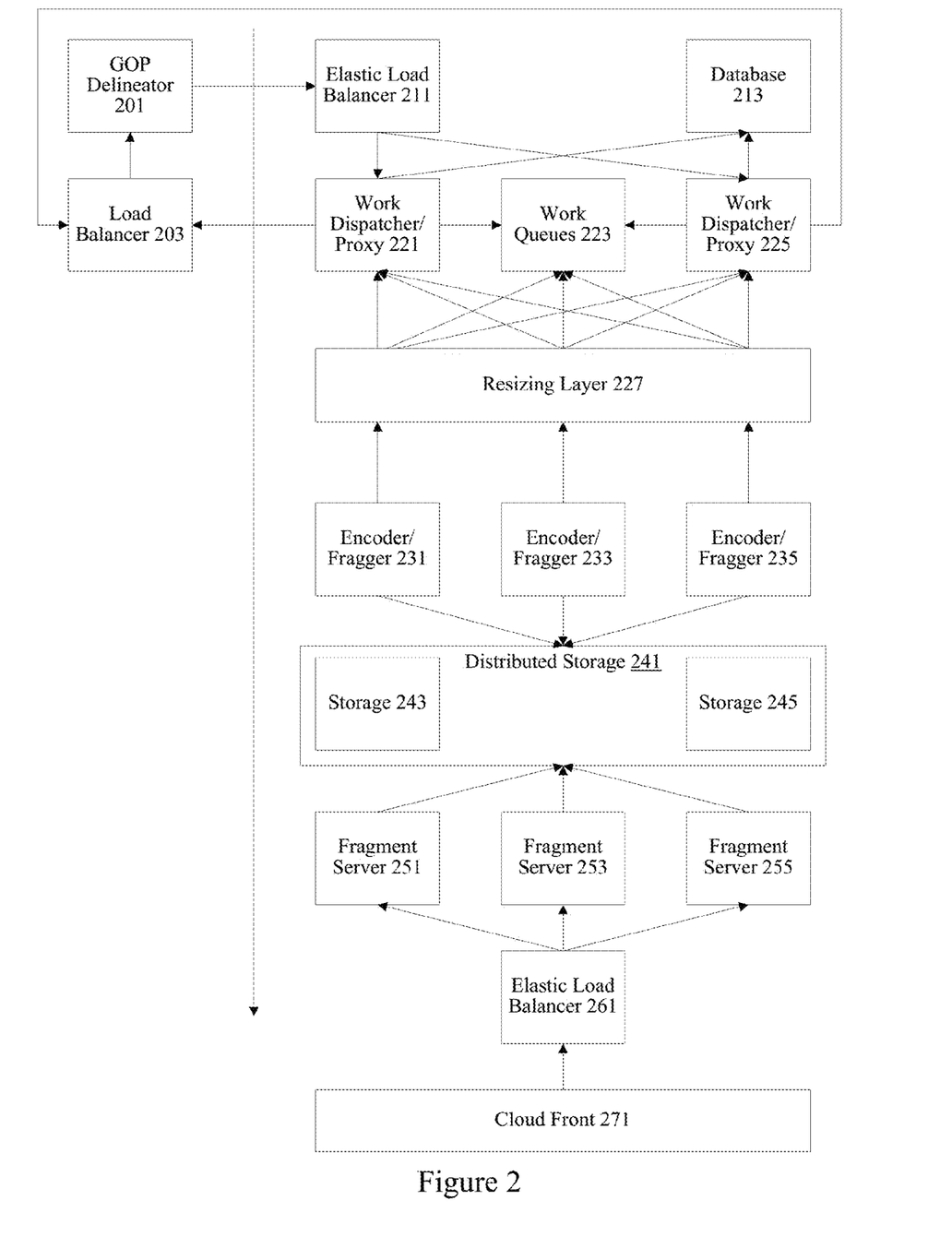
FIG. 2 illustrates one example of a mechanism for enhancing GOP alignment.

FIG. 2 illustrates one example of a distributed, scalable encoding system that provides for redundancy. According to various embodiments, a media stream is received from a content provider source such as a satellite. In particular embodiments, the media stream is provided in an MPEG-2 format. The media stream is delineated into Groups of Pictures (GOPs) using a GOP delineator 201. The GOP is a group of pictures in a coded media and typically includes key and predictive frames. A key frame may be an I-frame or intra-coded frame that represents a fixed image that is independent of other pictures. According to various embodiments, each GOP begins with an I-frame. Predictive frames such as P-frames or predictive-coded frames and B-frames or bidi-rectionally predictive coded frames contain different information indicating distinctions from a reference frames such as a key frame or another predictive frame. According to various embodiments, multiple GOP delineators 201 are active simultaneously. If a GOP delineator fails, other GOP delineators are available and all GOP delineators can send out notifications.

After the media stream is delineated into GOPs, an elastic load balancer 211 is used to distribute work to work dispatchers 221 and 225. If a work dispatcher fails right as it takes a notification, another notification occurs to a different work dispatcher. Two notifications for the same GOP will end up on two different machines. At each work dispatcher 221 and 225, there may also be a proxy. According to various embodiments, the GOP delineator 201 resides on a different data center than the work dispatchers 221 and 225. Using proxies at work dispatchers 221 and 225 allows for a single transfer of a media stream GOP between data centers.

According to various embodiments, the work dispatchers 221 and 225 determine who is a particular job and what should be done with the GOP. According to various embodiments, the work dispatchers 221 and 225 may determine that the GOP should be encoded into 8 different resolutions with 10 different variants for each resolution. In particular embodiments, the work dispatchers 221 and 225 create descriptions of what needs to be done and send jobs to job queues 223. According to various embodiments, job queues 223 include an active job queue and a standby job queue. According to various embodiments, job queues are first in first out (FIFO) queues that are empty most of the time. Timeouts may be associated with each job in the queue. Resizing Layer 227 may include one or more encoders that perform resizing of a particular stream prior to reencoding for different bit rates and frame rates. In some examples, 8 resizing components are provided to support 8 different solutions. For each resizing component, 10 encoders/fraggers are provided to generate a total of 80 variants. According to various embodiments, resizing layer 237 requests jobs and obtains them from job queues 223. The jobs are subsequently provided to encoders/fraggers 231, 233, and 235. In particular embodiments, encoders/fraggers 231, 233, and 235 are identical and can be dynamically activated or deactivated. According to various embodiments, hundreds or thousands of encoders/fraggers reside in a system.

In particular embodiments, the same device performs both resizing, encoding, and fragmentation, but it should be noted that separated devices can be used to perform these operations. According to various embodiments, additional resizing components and/or encoders/fraggers can be dynamically brought online when resource usage reaches a particular threshold. Alternatively, resizing components and/or encoders/fraggers can be taken offline when resources usage falls beneath a particular floor. According to various embodiments, encoder/fragger 231, 233, and 235 is a virtual machine that may reside on one or more physical servers that may or may not have specialized encoding hardware. In particular embodiments, a cloud service determines how many of these virtual machines to use based on established thresholds.

According to various embodiments, encoders/fraggers 231, 233, and 235 are stateless. According to various embodiments, a unique identifier is provided for each GOP and a log of each step is maintained. After the encoders/fraggers 231, 233, and 235 complete job and generate encoded fragments, the encoded fragments are maintained in distributed and redundant storage 241. In one example, distributed and redundant storage 241 is a virtualized scale out network attached storage system. The distributed and redundant storage 241 includes nodes 243 and 245, allowing a system to maintain numerous fragments on any number of virtualized storage devices.

According to various embodiments, fragments on distributed and redundant storage 241 are accessible by fragment servers 251, 253, and 255. The fragment servers 251, 253, and 255 provide the caching layer with fragments for clients. The design philosophy behind the client/server API minimizes round trips and reduces complexity as much as possible when it comes to delivery of the media data to a client device. The fragment servers 251, 253, and 255 provide live streams and/or DVR configurations. According to various embodiments, fragment servers operate without state. In particular embodiments, fragments servers operate using HTTP get requests. According to various embodiments, each process allows a flow to continue without having a centralized control point. An elastic load balancer 261 distributes fragment requests from a cloud front 271 to multiple fragment servers 251, 253, and 255.

According to various embodiments, a client device uses a media component that requests fragmented MPEG-4 files, allows trick-play, and manages bandwidth adaptation. In particular embodiments, each client device receives a media stream that is behind a live stream by 12 seconds or more. There may also be server buffering. According to various embodiments, GOP delineation, encoding, fragmentation can occur within a server buffering timeframe. By having numerous encoder/fraggers, capacity can be increased or decreased by percentage points at any time.

Figure 3:
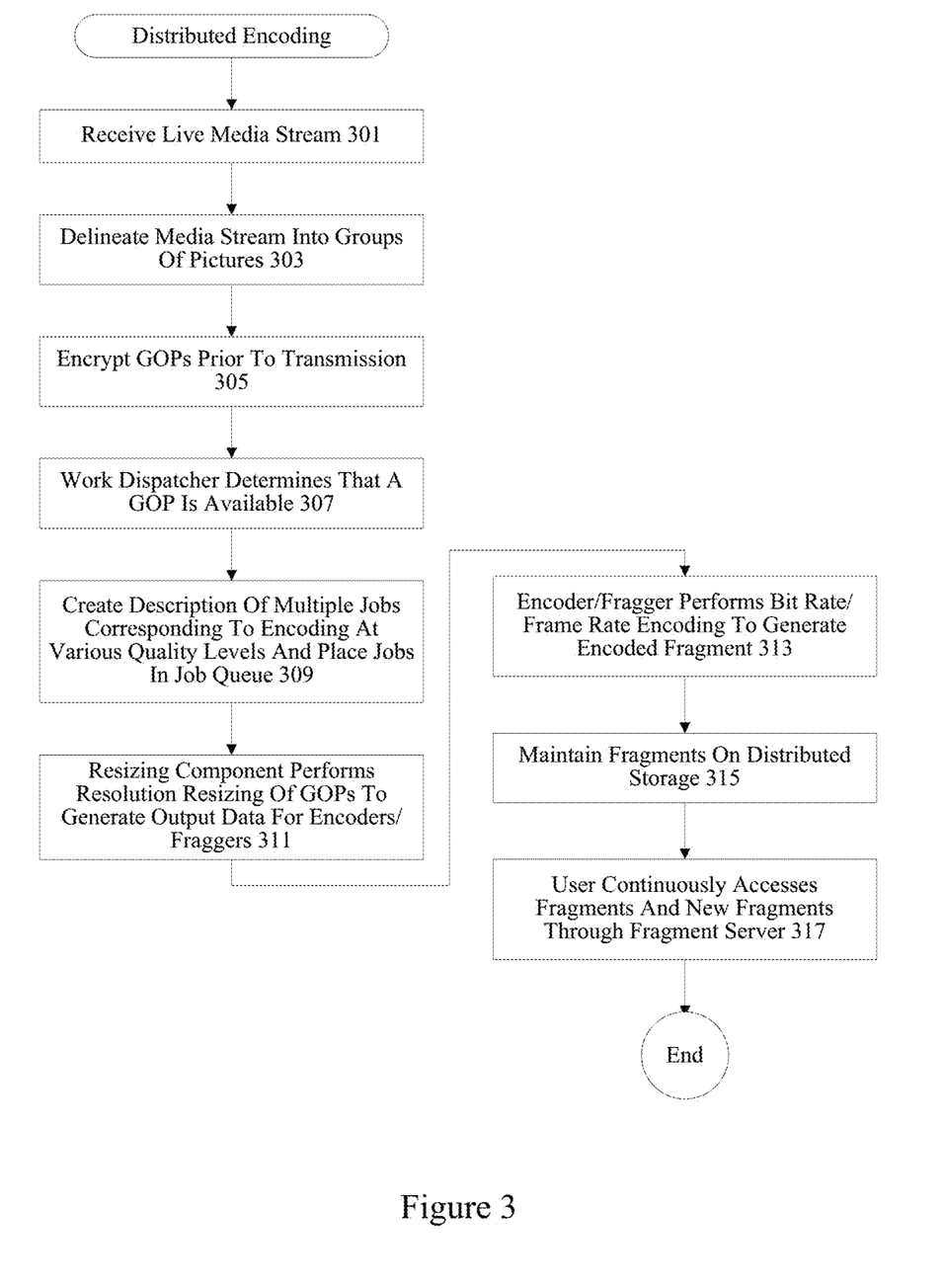
FIG. 3 illustrates a technique for performing GOP alignment.

FIG. 3 illustrates one example of a technique for performing distributed encoding. At 301, a live media stream is received. According to various embodiments, the media stream is alive MPEG-2 media stream received from a satellite receiver. In particular embodiments, a live media stream refers to a media program received at a particular time that is designated for distribution at that particular time. For example, a program may be configured to run at 8 pm PST, and the live media stream is received at the satellite receiver at 8 pm PST. At 303, the media stream is delineated into GOPs. In particular embodiments, key frames are identified and used to begin groups of pictures. The GOPs may be optionally encrypted at this point before transmission at 305.

At 307, a work dispatcher determines that a GOP is available. According to various embodiments, the GOP delineator and the work dispatcher reside in different data centers and it is desirable to have a single GOP transfer instead of redundant GOP transfers. At 309, the work dispatcher creates a description of multiple jobs corresponding to different encoding quality levels and places the job in work queues. At 311, a resizing component obtains the job from the job queue and performs processing to output data at the appropriate resolution. In particular embodiments, numerous resizing components perform processing to output data at numerous different resolutions. An encoder/fragger at 313 encodes the appropriate resolution GOP into a format such as H.264 at a particular frame rate and/or bit rate fragments. In particular embodiments, numerous encoders/fraggers encode corresponding resolution GOPs into particular frame rate and/or bit rate fragments.

By performing resizing first at 311, encoding and fragmentation can be performed more efficiently at 313. Each encoder/fragger need not perform resolution adjustment along with bit rate and frame rate encoding but can instead merely perform bit rate and frame rate encoding. Encoded fragments are maintained on distributed storage at 315. A user can then continuously access the encoded fragments at a particular quality level through a fragment server at 317 that allows real-time or near real-time Internet Protocol (IP) distribution of the media stream fragments.

Figure 4:
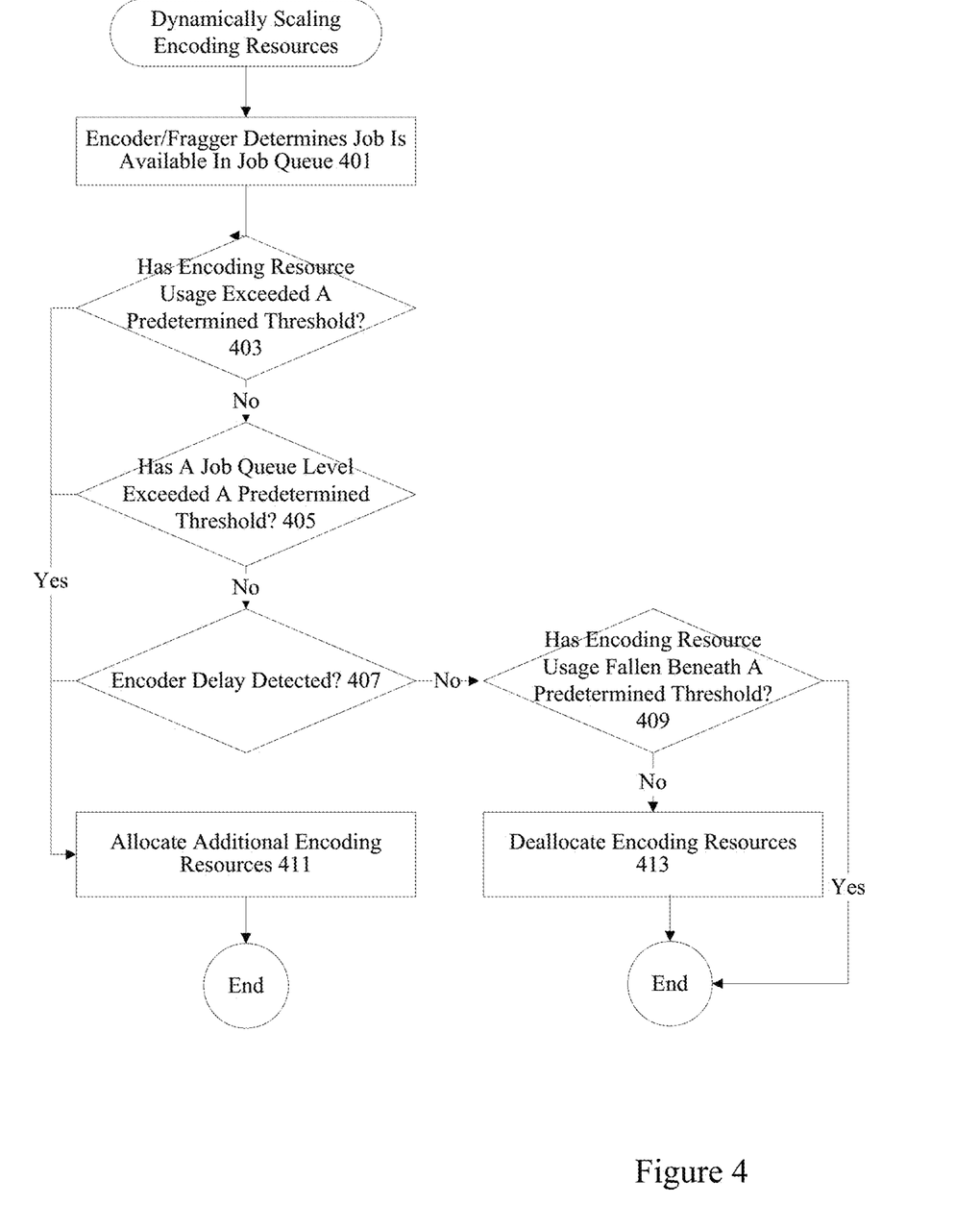
FIG. 4 illustrates a technique for scaling distributed encoding resources.

FIG. 4 illustrates a technique for dynamically scaling encoding resources. At 401, an encoder/fragger determines that a job is available in a job queue. According to various embodiments, additional encoder/fragger resources may be allocated if existing encoder/fragger resources are consumed beyond a particular threshold at 403. For example, if processing resource usage exceeds a particular threshold such as an 80% threshold, an additional virtual machine is allocated for encoding and fragmentation at 411. According to various embodiments, if processing resource usage falls beneath a particular threshold such as a 50% threshold at 409, virtual machines may be taken offline at 413. In particular embodiments, job queue levels can also be used to adjust resource allocation. If job queue levels exceed a particular threshold at 405, additional encoding and fragmentation resources can be allocated at 411. According to various embodiments, live stream media encoding delay may be detected at 407 and used to allocate additional resources at 411. In some examples, it may be determined that requests for fragments may be received far before fragments are available. Higher processing power resources or higher quality resources may be allocated to perform encoding and fragmentation.

Figure 5:
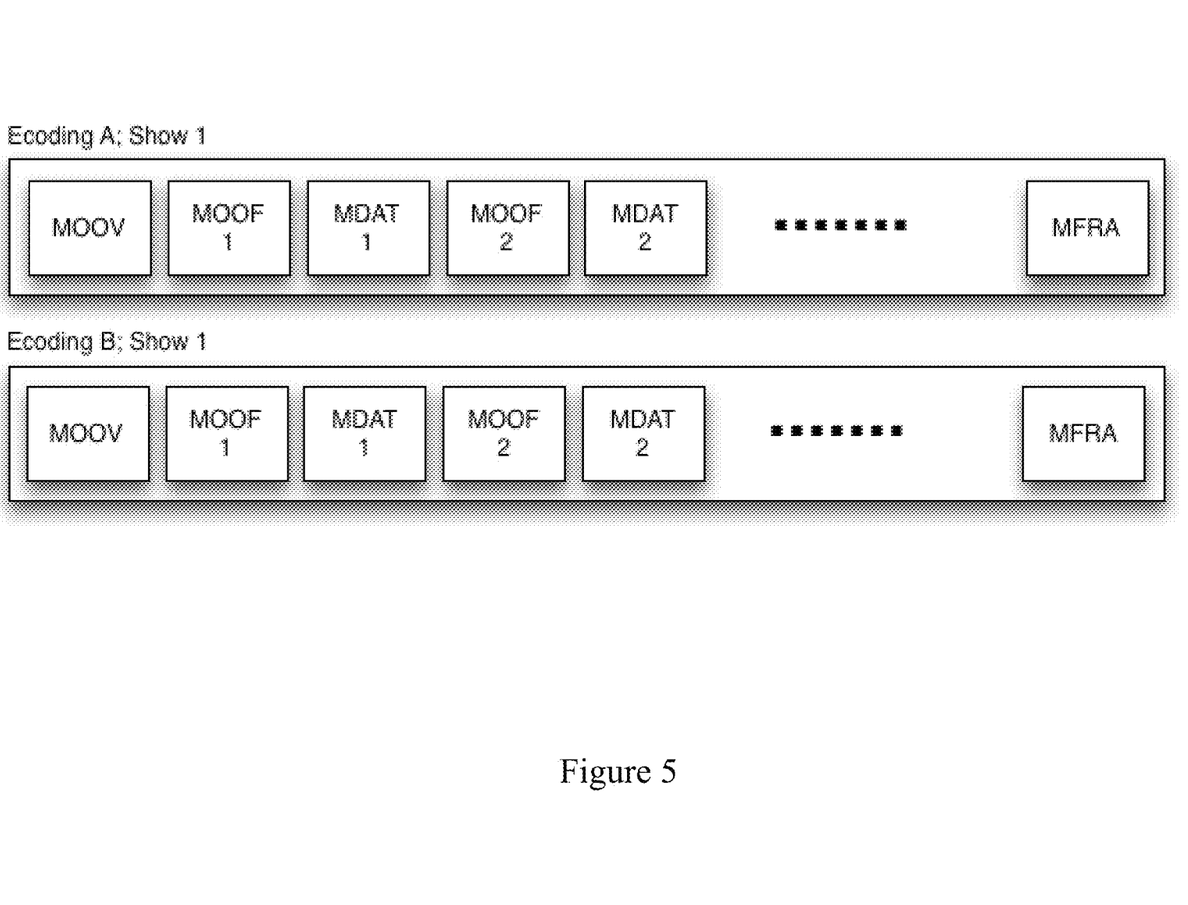
FIG. 5 illustrates examples of files stored by a fragment writer.

FIG. 5 illustrates examples of files stored by the fragment writer. According to various embodiments, the fragment writer is a component in the overall fragmenter. It is a binary that uses command line arguments to record a particular program based on either NTP time from the encoded stream or wallclock time. In particular embodiments, this is configurable as part of the arguments and depends on the input stream. When the fragment writer completes recording a program it exits. For live streams, programs arc artificially created to be short time intervals e.g. 5-15 minutes in length.

According to various embodiments, the fragment writer command line arguments are the SDP file of the channel to record, the start time, end time, name of the current and next output files. The fragment writer listens to RTP traffic from the live video encoders and rewrites the media data to disk as fragmented MPEG-4. According to various embodiments, media data is written as fragmented MPEG-4 as defined in MPEG-4 part 12 (ISO/IEC 14496-12). Each broadcast show is written to disk as a separate file indicated by the show ID (derived from EPG). Clients include the show ID as part of the channel name when requesting to view a prerecorded show. The fragment writer consumes each of the different encodings and stores them as a different MPEG-4 fragment.

In particular embodiments, the fragment writer writes the RTP data for a particular encoding and the show ID field to a single file. Inside that file, there is metadata information that describes the entire file (MOOV blocks). Atoms are stored as groups of MOOF/MDAT pairs to allow a show to be saved as a single file. At the end of the file there is random access information that can be used to enable a client to perform bandwidth adaptation and trick play functionality.

According to various embodiments, the fragment writer includes an option which encrypts fragments to ensure stream security during the recording process. The fragment writer will request an encoding key from the license manager. The keys used are similar to that done for DRM. The encoding format is slightly different where MOOF is encoded. The encryption occurs once so that it does not create prohibitive costs during delivery to clients.

The fragment server responds to HTTP requests for content. According to various embodiments, it provides APIs that can be used by clients to get necessary headers required to decode the video, seek to any desired time frame within the fragment and APIs to watch channels live. Effectively, live channels are served from the most recently written fragments for the show on that channel. The fragment server returns the media header (necessary for initializing decoders), particular fragments, and the random access block to clients. According to various embodiments, the APIs supported allow for optimization where the metadata header information is returned to the client along with the first fragment. The fragment writer creates a series of fragments within the file. When a client requests a stream, it makes requests for each of these fragments and the fragment server reads the portion of the file pertaining to that fragment and returns it to the client.

According to various embodiments, the fragment server uses a REST API that is cache friendly so that most requests made to the fragment server can be cached. The fragment server uses cache control headers and ETag headers to provide the proper hints to caches. This API also provides the ability to understand where a particular user stopped playing and to start play from that point (providing the capability for pause on one device and resume on another).

In particular embodiments, client requests for fragments follow the following format:
http://{HOSTNAME}drag/{CHANNEL}/{BITRATE}/ [{ID}/] {COMMAND}[/{ARG}]e.g. http://frag.hosttv .com/frag/1/H8QVGAH264/1270059632.mp4/fragment/ 42.

According to various embodiments, the channel name will be the same as the backend-channel name that is used as the channel portion of the SDP file. VoD uses a channel name of "vod". The BITRATE should follow the BITRATE/RESOLUTION identifier scheme used for RTP streams. The ID is dynamically assigned. For live streams, this may be the UNIX timestamp; for DVR this will be a unique ID for the show; for VoD this will be the asset ID. The ID is optional and not included in LIVE command requests. The command and argument are used to indicate the exact command desired and any arguments. For example, to request chunk 42 this portion would be "fragment/42".

The URL format makes the requests content delivery network (CDN) friendly because the fragments will never change after this point so two separate clients watching the same stream can be serviced using a cache. In particular, the headend architecture leverages this to avoid too many dynamic requests arriving at the Fragment Server by using an HTTP proxy at the head end to cache requests.

According to various embodiments, the fragment controller is a daemon that runs on the fragmenter and manages the fragment writer processes. We propose that it uses a configured filter that is executed by the Fragment Controller to generate the list of broadcasts to be recorded. This filter integrates with external components such as a guide server to determine which shows to record and the broadcast ID to use.

According to various embodiments, the client includes an application logic component and a media rendering component. The application logic component presents the UI for the user and also communicates to the front-end server to get shows that are available for the user and to authenticate. As part of this process, the server returns URLs to media assets that are passed to the media rendering component.

In particular embodiments, the client relies on the fact that each fragment in a fragmented MPEG-4 file has a sequence number. Using this knowledge and a well defined URL structure for communicating with the server, the client requests fragments individually as if it was reading separate files from the server simply by requesting urls for files associated with increasing sequence numbers. In some embodiments, the client can request files corresponding to higher or lower bit rate streams depending on device and network resources.

Since each file contains the information needed to create the URL for the next file, no special playlist files are needed, and all actions (startup, channel change, seeking) can be performed with a single HTTP request. After each fragment is downloaded the client assesses among other things the size of the fragment and the time needed to download it in order to determine if downshifting is needed, or if there is enough bandwidth available to request a higher bitrate.

Because each request to the server looks like a request to a separate file, the response to requests can be cached in any HTTP Proxy, or be distributed over any HTTP based CDN.

Figure 6:
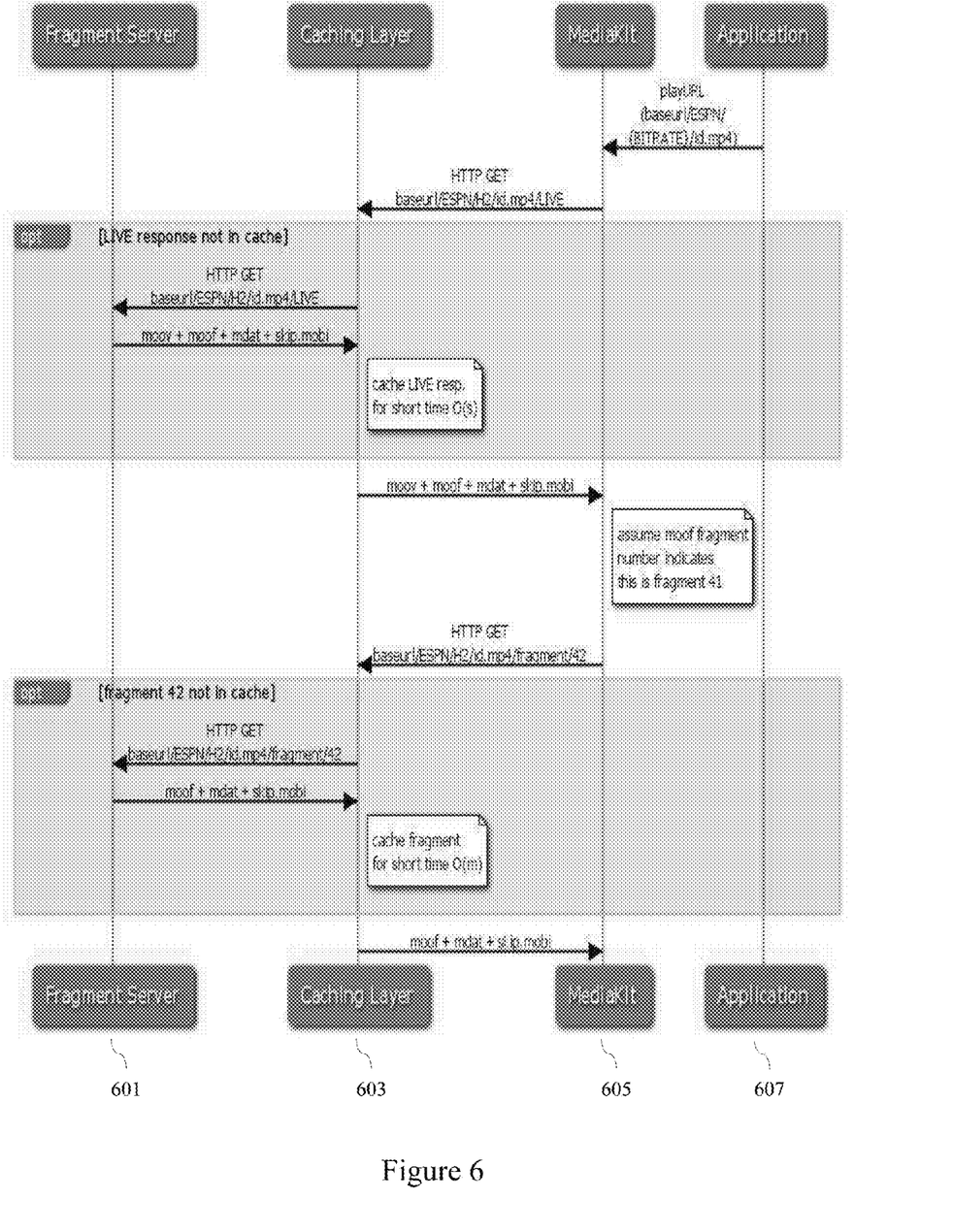
FIG. 6 illustrates one example of an exchange used with a fragmentation system.

FIG. 6 illustrates an interaction for a client receiving a live stream. The client starts playback when fragment plays out from the server. The client uses the fragment number so that it can request the appropriate subsequence file fragment. An application such as a player application 607 sends a request to mediakit 605. The request may include a base address and bit rate. The mediakit 605 sends an HTTP get request to caching layer 603. According to various embodiments, the live response is not in cache, and the caching layer 603 forward the HTTP get request to a fragment server 601. The fragment server 601 performs processing and sends the appropriate fragment to the caching layer 603 which forwards to the data to mediakit 605.

The fragment may be cached for a short period of time at caching layer 603. The mediakit 605 identifies the fragment number and determines whether resources are sufficient to play the fragment. In some examples, resources such as processing or bandwidth resources are insufficient. The fragment may not have been received quickly enough, or the device may be having trouble decoding the fragment with sufficient speed. Consequently, the mediakit 605 may request a next fragment having a different data rate. In some instances, the mediakit 605 may request a next fragment having a higher data rate. According to various embodiments, the fragment server 601 maintains fragments for different quality of service streams with timing synchronization information to allow for timing accurate playback.

The mediakit 605 requests a next fragment using information from the received fragment. According to various embodiments, the next fragment for the media stream may be maintained on a different server, may have a different bit rate, or may require different authorization. Caching layer 603 determines that the next fragment is not in cache and forwards the request to fragment server 601. The fragment server 601 sends the fragment to caching layer 603 and the fragment is cached for a short period of time. The fragment is then sent to mediakit 605.

Figure 7:
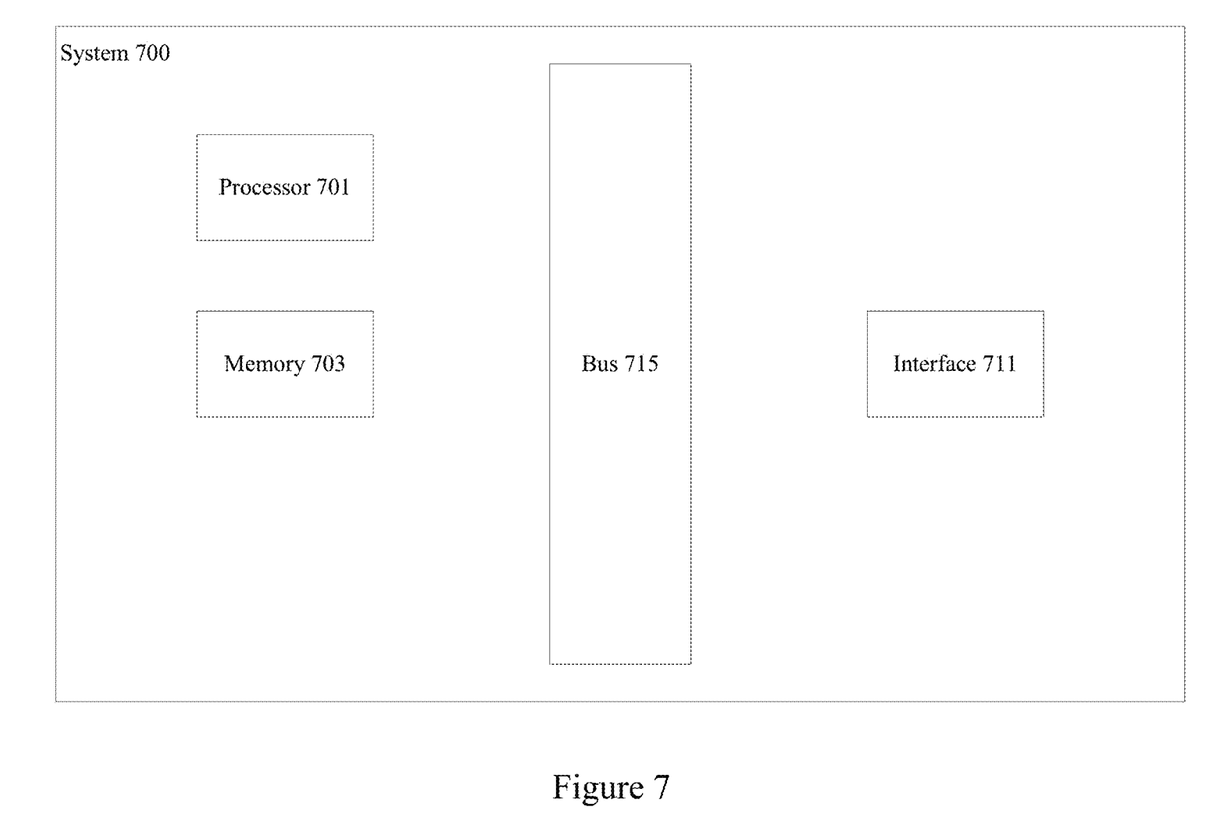
FIG. 7 illustrates one example of a system.

FIG. 7 illustrates one example of a computer system. According to particular embodiments, a system 700 suitable for implementing particular embodiments of the present invention includes a processor 701, a memory 703, an interface 711, and a bus 715 (e.g., a PCI bus or other interconnection fabric) and operates as a streaming server. When acting under the control of appropriate software or firmware, the processor 701 is responsible for modifying and transmitting live media data to a client. Various specially configured devices can also be used in place of a processor 701 or in addition to processor 701. The interface 711 is typically configured to send and receive data packets or data segments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 700 is a fragment server that also includes a transceiver, streaming buffers, and a program guide database. The fragment server may also be associated with subscription management, logging and report generation, and monitoring capabilities. In particular embodiments, functionality for allowing operation with mobile devices such as cellular phones operating in a particular cellular network and providing subscription management. According to various embodiments, an authentication module verifies the identity of devices including mobile devices. A logging and report generation module tracks mobile device requests and associated responses. A monitor system allows an administrator to view usage patterns and system availability. According to various embodiments, the fragment server handles requests and responses for media content related transactions while a separate streaming server provides the actual media streams.

Although a particular fragment server is described, it should be recognized that a variety of alternative configurations are possible. For example, some modules such as a report and logging module and a monitor may not be needed on every server. Alternatively, the modules may be implemented on another device connected to the server. In another example, the server may not include an interface to an abstract buy engine and may in fact include the abstract buy engine itself. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method for generating a group of pictures (GOP) aligned variants from a media stream, comprising:
    receiving the media stream from a content source;
    delineating, using a GOP delineator that splits the GOPs into a plurality of different paths that correspond to a plurality of different resolutions, the media stream into a plurality of groups of pictures (GOPs) including a first GOP, the first GOP including a key frame and a predictive frame;
    encrypting the plurality of GOPs, including the first GOP;
    distributing, through an elastic load balancer, work corresponding to the first GOP to one or more work dispatchers;
    determining, by the one or more work dispatchers, that the first GOP should be encoded into a plurality of a resolutions with a plurality of different GOP aligned variants for each resolution of the plurality of resolutions;
    creating, by the one or more work dispatchers, jobs corresponding to the encoding of the first GOP and sending the jobs to a work queue, the jobs corresponding to different encoding quality levels;
    providing the first GOP to a resizing layer, the resizing layer configured to perform resizing on media stream data corresponding to a plurality of different variants for each resolution of the plurality of resolutions for the first GOP,
    the resizing layer including resizing components that obtain the jobs from the job queues and performs processing and resizing to output media stream data at the appropriate resolutions;
    encoding and fragmenting, using a plurality of distributed encoders and fragmenters, to process the resized output media stream data for each of the plurality of resolutions to generate the plurality of different GOP aligned variants corresponding to the first GOP,
    the GOP aligned variants associated with a plurality of bit rates and frame rates for each of the plurality of resolutions, the plurality of distributed encoders and fragmenters configured to be dynamically brought online when resource usage reaches a particular threshold and dynamically taken offline when resource usage falls beneath a particular floor,
    wherein the plurality of distributed encoders and fragmenters align the key frames associated with each GOP aligned variant even if the GOP aligned variants have different resolutions;
    sending, in response to a fragment request from a client device, GOP aligned fragments corresponding to the first GOP, wherein the GOP aligned fragments are configured to allow the client device to adaptively switch between variants of the first GOP with different resolution without having to make temporal adjustments due to GOP misalignment, wherein switching between variants appear seamless to a user of the client device.

2. The method of claim 1, wherein the resizing layer comprises a plurality of resizing components and the plurality of encoders and fragmenters are dynamically scalable virtual machines.

3. The method of claim 1, wherein the plurality of encoders and fragmenters process the output media stream data for each of the plurality of resolutions simultaneously to output a plurality of GOP aligned variants.

4. The method of claim 3, wherein the plurality of GOP aligned variants each have a different combination of resolution, bit rate, and frame rate.

5. The method of claim 3, wherein the plurality of GOP aligned variants each have corresponding key frames residing at the same times.

6. The method of claim 1, wherein the GOP aligned variants are provided as a plurality of fragments and the plurality of fragments are maintained in distributed storage.

7. A system for generating a group of pictures (GOP) aligned variants from a media stream, comprising:
    a processor and memory configured to receive the media stream from a content source;
    a group of pictures (GOP) delineator that splits the GOPs into a plurality of different paths that correspond to a plurality of different resolutions, the GOP delineator configured to delineate the media stream into a plurality of groups of pictures (GOPs) including a first GOP, the first GOP including a key frame and a predictive frame;
    a fragment writer that uses command line arguments to record a particular program based on either network time protocol (NTP) time from the encoded stream or wall-clock time, the fragment writer configured to encrypt fragments;
    a work dispatcher configured to determine that the first GOP should be encoded into a plurality of resolutions with a plurality of different GOP aligned variants for each resolution of the plurality of resolution,
    wherein the work dispatcher is further configured to create jobs corresponding to the encoding of the first GOP and sending the jobs to a work queue, the jobs corresponding to different encoding quality levels,
    wherein the work dispatcher is also further configured to provide the first GOP to a resizing layer, the resizing layer configured to perform resizing on media stream data corresponding to the plurality of different variants for each resolution of the plurality of resolutions for the first GOP,
    the resizing layer including resizing components that obtain the jobs from the job queues and perform processing and resizing to output media stream data at the appropriate resolution;
    a plurality of a distributed encoders and fragmenters configured to encode and fragment to process the resized output media stream data for each of the plurality of resolution to generate the plurality of different GOP aligned variants corresponding to the first GOP, the GOP aligned variants associated with a plurality of bit rated and frame rates for each of the plurality of resolutions, the plurality of distributed encoders and fragmenters configured to be dynamically brought online when resource usage reaches a particular threshold and dynamically taken offline when resource usage fall beneath a particular floor, wherein the plurality of distributed encoders and fragmenters align the key frames associated with each GOP aligned variants even if the GOP aligned variants have different resolutions;

a fragment server configured to send, in response to a fragment request from a client device, GOP aligned fragments corresponding to the first GOP, wherein the GOP aligned fragments are configured to allow the client device to adaptively switch between variants of the first GOP with different resolutions without having to make temporal adjustment due to GOP misalignment, wherein switching between variants appear seamless to user of the client device.

8. The system of claim 7, wherein the resizing layer comprises a plurality of resizing components and the plurality of encoders and fragmenters are dynamically scalable virtual machines.

9. The system of claim 7, wherein the plurality of encoders and fragmenters process the output media stream data for each of the plurality of paths simultaneously to output a plurality of GOP aligned variants.

10. The system of claim 9, wherein the plurality of GOP aligned variants each have a different combination of resolution, bit rate, and frame rate.

11. The system of claim 9, wherein the plurality of GOP aligned variants each have corresponding key frames residing at the same times.

12. The system of claim 7, wherein the GOP aligned variants are provided as a plurality of fragments and the plurality of fragments are maintained in distributed storage.

13. A non-transitory computer readable medium containing instruction for generating a group of pictures (GOP) aligned variants from a media stream, the non-transitory computer readable medium comprising:

instructions for receiving the media stream from a content source;

instructions for delineating, using a GOP delineator that splits the GOPs into a plurality of different paths that correspond to a plurality of different resolutions, the media stream into a plurality of groups of pictures (GOPs) including a first GOP, the first GOP including a key frame and a predictive frame;

instructions for encrypting the plurality of GOPs, including the first GOP;

instructions for distributing ,through an elastic load balancer, work corresponding to the first GOP to one or more work dispatchers;

instruction for determining, by the one or more work dispatchers, that the first GOP should be encoded into a plurality of resolutions with a plurality of different GOP aligned variants for each resolution of the plurality of resolution;

instructions for creating, by the one or more work dispatchers, jobs corresponding to the encoding of the first GOP and sending the jobs to a work queue, the jobs corresponding to different encoding quality levels;

instructions for providing the first GOP to a resizing layer the resizing layer configured to perform resizing on media stream data corresponding to the plurality of different variants for each resolution of the plurality of resolutions for the first GOP, the resizing layer including resizing components that obtain the jobs from the job queues and performs processing and resizing to output media stream data at the appropriate resolutions;

instructions for encoding and fragmenting, using a plurality of distributed encoders and fragmenters, to process the resized output media stream data for each of the plurality of resolutions to generate the plurality of different GOP aligned variants corresponding to the first GOP, the GOP aligned variants associated with a plurality of bit rates and frame rates for each of the plurality of resolution, the plurality of distributed encoders and fragmenters configured to be dynamically brought online when resource usage reaches a particular threshold and dynamically taken offline when resource usage falls beneath a particular floor, wherein the plurality of distributed encoders and fragmenters align the key frames associated with each GOP aligned variants even if the GOP aligned variants have different resolutions;

instructions for sending, in response to a fragment request from a client device, GOP aligned fragments corresponding to the first GOP with different resolutions without having to make temporal fragments corresponding to the first GOP with different resolutions without having to make temporal adjustments due to GOP misalignment, wherein the GOP aligned fragments are configured to allow the client device to adaptively switch between variants of the first GOP, wherein switching between variants appear seamless to a user of the client device.

14. The non-transitory computer readable medium of claim 13, wherein the resizing layer comprises a plurality of resizing components and the plurality of encoders and fragments are dynamically scalable virtual machines.

* * * * *